United States Patent [19]
Matteucci et al.

[11] Patent Number: 5,758,452
[45] Date of Patent: Jun. 2, 1998

[54] FLORAL ARRANGING AID

[76] Inventors: Carlo Matteucci; Elizabeth Matteucci, both of 4564 Sequoyah Rd., Oakland, Calif. 94605

[21] Appl. No.: 711,102

[22] Filed: Sep. 9, 1996

[51] Int. Cl.$^6$ .................... A01G 5/00; A47G 7/00
[52] U.S. Cl. ............. 47/41.01; 47/41.11; 47/41.13
[58] Field of Search .................... 47/41.01, 41.1, 47/41.11, 41.12, 41.13

[56] References Cited

U.S. PATENT DOCUMENTS

| | | | |
|---|---|---|---|
| 427,402 | 5/1890 | Christie | 47/41.01 |
| 1,462,947 | 7/1923 | Stuck | 47/41.11 |
| 1,562,992 | 11/1925 | Schling | 47/41.11 |
| 1,629,112 | 5/1927 | MacDonald | 47/41.11 |
| 2,005,467 | 4/1935 | Menge | 47/41.11 |
| 2,381,253 | 8/1945 | Bierwert | 47/41.11 |
| 2,700,848 | 2/1955 | Reynolds | 47/41.13 |
| 3,447,262 | 6/1969 | Uhl | 47/41.11 |
| 3,767,104 | 10/1973 | Bachman et al. | 47/41.01 |
| 4,937,109 | 6/1990 | Lin | 47/41.12 |

FOREIGN PATENT DOCUMENTS

| | | | |
|---|---|---|---|
| 2261148 | 6/1974 | Germany | 47/41.01 |
| 2648962 | 5/1978 | Germany | 47/41.01 |
| 2147205 | 5/1985 | United Kingdom | 47/41.12 |

*Primary Examiner*—Michael J. Carone
*Assistant Examiner*—Joanne C. Downs
*Attorney, Agent, or Firm*—Linval B. Castle

[57] ABSTRACT

A floral arranging aid for holding flowers in a vase comprises a vase top cover of plastic or cardboard having a plurality of partially scored apertures that are opened by a flower stem. The apertures are arranged in rows and columns that are coded so that each aperture is located at a junction.

4 Claims, 2 Drawing Sheets

FLORAL ARRANGING AID

BRIEF SUMMARY OF THE INVENTION

This invention relates generally to floral arranging aids and in particular to a novel vase covering grid having a plurality of coded piercable openings for both holding flowers erect in the vase and for identifying locations for each type of flower.

Vase covering grids in various forms have been in use for many years for the erect holding of floral arrangements. A typical floral grid comprises a usually circular cardboard or plastic disc approximately the size of the top surface of a vase and having a plurality of circular or square apertures. The grid is generally attached to the vase by an adhesive on the bottom periphery of the grid or by a clear tape.

The vase covering grid of the invention is of this type, but with the following differences. It has a plurality of apertures that are only partially scored and are opened by the stem of a flower being pushed through. And each of the scored apertures is coded, such as, by a number or letter or by a color or symbol.

With such a coded vase covering grid it would be convenience to the owner of a chain of florist shops to instruct each employee how to prepare a "bouquet-of-the-day", or to recall what the featured bouquet was two weeks ago. In record keeping, the coded grid would be valuable to identify a long expired floral pattern.

The coded grid is also valuable for sales promotion. A casual admirer of a well-balanced vase of flowers in a florist's shop may easily be convinced to purchase flowers if instructed exactly how and where each type and color were to be placed in a vase. If the flowers were accompanied by a coded vase covering grid and prepared instructions on where each flower should be located in the grid, many sales should result.

DESCRIPTION OF THE DRAWING

In the drawings which illustrate a preferred embodiment of the invention.

DESCRIPTION OF THE PREFERRED EMBODIMENT

Most commercial vases for holding bouquets of fresh flowers have circular tops approximately two to three inches in diameter. Into this small diameter florists artistically arrange the flowers into a beautiful floral display which will later often appear to just be stuffed into the vase if steps are not taken to secure the positions of the flowers in the vase.

Figure 1:
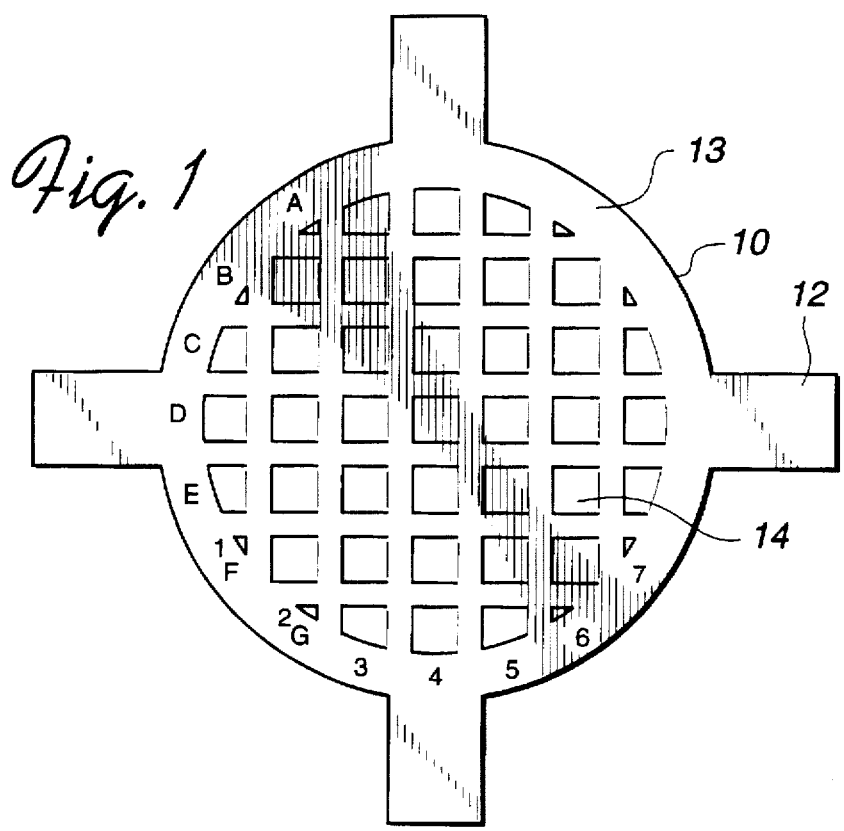
FIG. 1 is a plan view of the vase covering grid.
Figure 2:
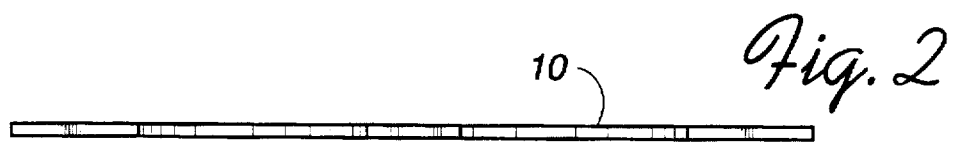
FIG. 2 is an edge view thereof.

The vase covering grid of FIG. 1 secures the position of each flower stem in the vase, thus assuring that the floral arrangement remains undamaged. The vase covering grid 10 of FIG. 1 is preferably formed of a thin transparent plastic with an overall size approximately equal to that of the vase which, in the preferred embodiment, is circular and has three of four side tabs 12 which have an adhesive on the bottom surface for adhering to the sides of a vase. An adhesive may also be applied to the bottom surface of the circular band 13 at the periphery of the vase covering grid for adhering to the vase rim, if desired.

Figure 3:
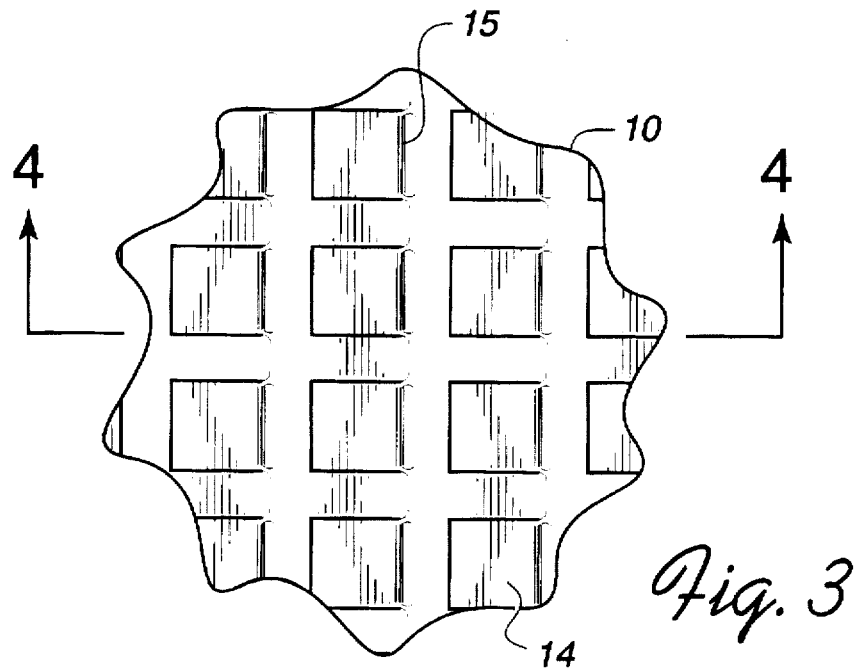
FIG. 3 is an enlarged section of the grid showing the partially scored apertures.
Figure 4:
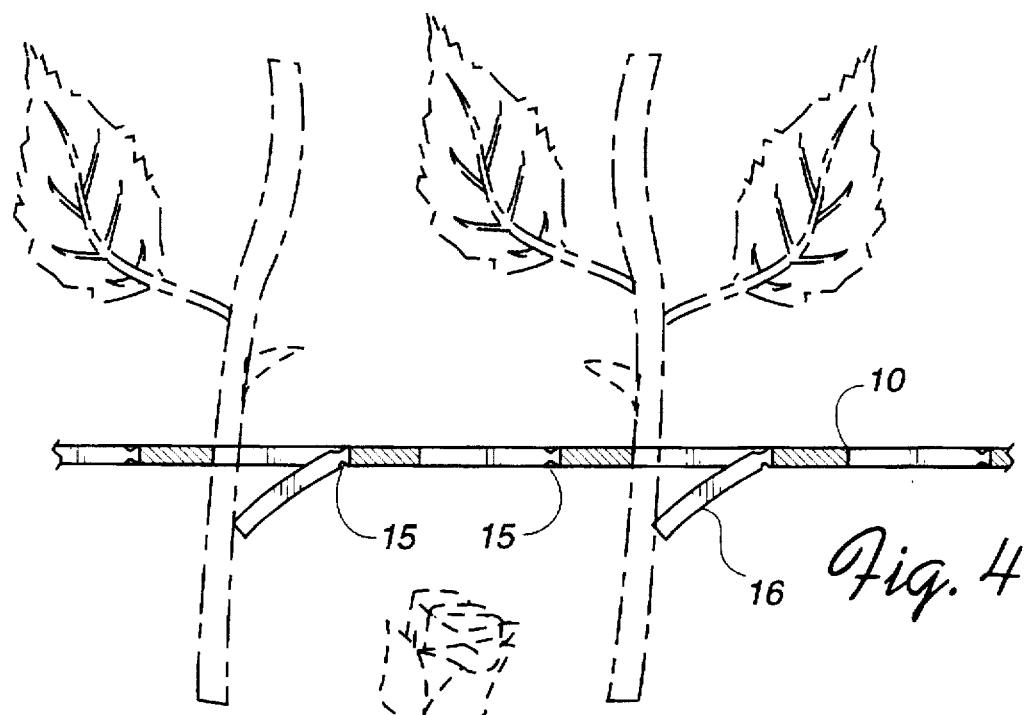
FIG. 4 is an edge view taken along the lines 4—4 of FIG. 3.

In the illustrated embodiment, the vase covering grid 10 has a plurality of forty-nine apertures, such as the square aperture 14, partially scored in nine rows and nine columns in the surface. Each scored aperture is cut on only three sides as shown in FIG. 3 so that the fourth side 15 acts as a hinge. The plastic therefore remains intact until forced open by a stem being pushed into the plastic covered aperture, as shown by the deflection of the plastic aperture 16 in FIG. 4.

Figure 5:
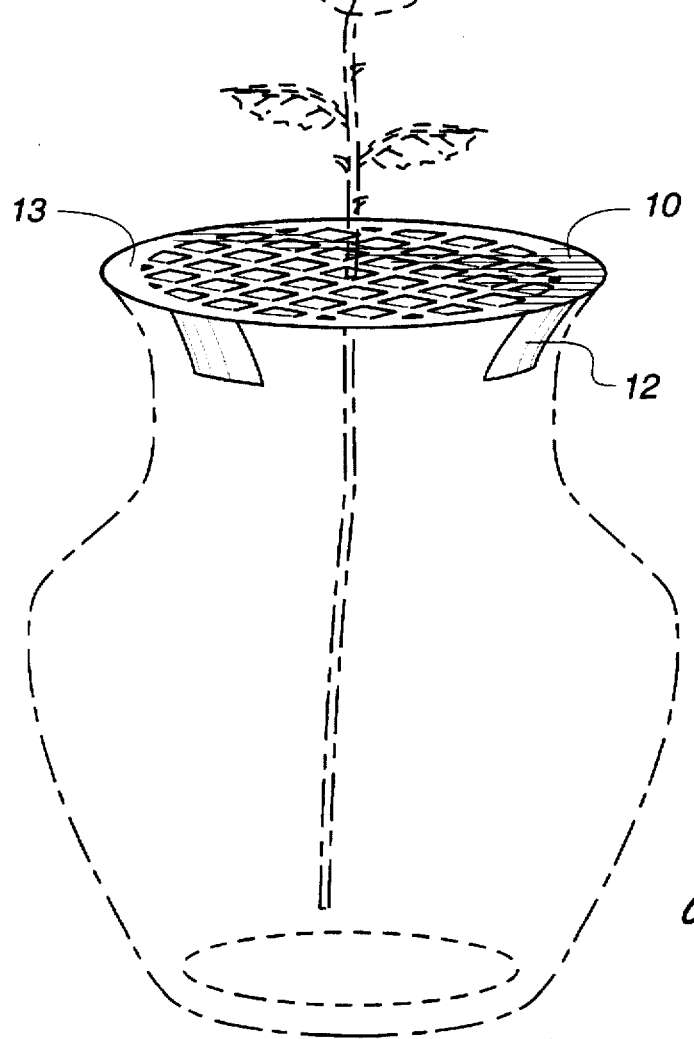
FIG. 5 is a perspective view of the grid positioned on a vase.

In the vase covering grid of FIG. 1, each horizontal row of apertures is identified with a letter and each vertical column with a number printed on the edge of the surface. The aperture 14 is in row E and in column 6 and may therefore be located on the surface by the alphanumeric code E6. In FIG. 5, the flower shown by broken lines is inserted in the center of the grid, and according to the code shown in FIG. 1, at location D4.

With each scored aperture identifiable by a specific code, instructions on how to arrange a certain type of floral spray or bouquet may be published, or a record of past floral arrangements may be filed away for future use. The code used in the preferred embodiment employs letters for identifying each horizontal row and numbers for identifying each vertical column. Other codes may be used, for example printing each aperture scoring with an individual number or letter, or by identifying columns and rows, or even sections or groups of several apertures, by different colors or by some type of symbol.

We claim:

1. A floral arranging aid comprising:

a vase cover having a plurality of partially scored apertures, each of said partially scored apertures being opened by insertion therein of a flower stem, said vase cover having an adhesive on one surface adjacent its periphery for adhering said cover to an open top of a vase;

at least three tabs extending from the periphery of said vase cover, said tabs having an adhesive on one surface for adhering said vase cover to a vase, and coding means on a surface of said vase cover for identifying partially scored apertures in said plurality.

2. The floral arranging aid claimed in claim 1 wherein each individual partially scored aperture is identifiable by said coding means.

3. The floral arranging aid claimed in claim 1 wherein said partially scored apertures are arranged in coded rows and columns on said vase cover, each partially scored aperture being at a junction of one of said coded rows and columns.

4. The floral arranging aid claimed in claim 1 wherein said partially scored apertures are square shaped and said partially scored apertures are cut on three sides of said square shape.

* * * * *